US012373574B2

United States Patent
Gjorvad et al.

(10) Patent No.: US 12,373,574 B2
(45) Date of Patent: Jul. 29, 2025

(54) MACHINE-LEARNING TECHNIQUES FOR RISK ASSESSMENT BASED ON MULTIPLE DATA SOURCES

(71) Applicant: EQUIFAX INC., Atlanta, GA (US)

(72) Inventors: David Gjorvad, Atlanta, GA (US); Michael Pecen, Sacramento, CA (US); Jonathan Fenstermaker, Alpharetta, GA (US); Oyenola Ogunyemi-Craig, Smyrna, GA (US); Deepaa Sundaram, East Cobb, GA (US)

(73) Assignee: EQUIFAX INC., Atlanta, GA (US)

( * ) Notice: Subject to any disclaimer, the term of this patent is extended or adjusted under 35 U.S.C. 154(b) by 187 days.

(21) Appl. No.: 18/146,305

(22) Filed: Dec. 23, 2022

(65) Prior Publication Data

US 2023/0205893 A1 Jun. 29, 2023

Related U.S. Application Data

(60) Provisional application No. 63/266,016, filed on Dec. 27, 2021.

(51) Int. Cl.
*G06F 21/57* (2013.01)
(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | |
|---|---|---|---|
| 12,069,082 B2 * | 8/2024 | Shao | G06N 3/045 |
| 2020/0177617 A1 * | 6/2020 | Hadar | G06F 21/552 |
| 2021/0133331 A1 * | 5/2021 | Lipkis | H04L 63/1483 |
| 2022/0400131 A1 * | 12/2022 | Shao | G06N 3/0455 |
| 2023/0009127 A1 * | 1/2023 | Boyer | H04L 63/1425 |
| 2023/0121058 A1 * | 4/2023 | Kinyon | G06F 21/554 |
| | | | 726/7 |

* cited by examiner

*Primary Examiner* — Kristie D Shingles
(74) *Attorney, Agent, or Firm* — Kilpatrick Townsend & Stockton LLP

(57) ABSTRACT

Systems and methods for using machine-learning techniques to provide risk assessment based on multiple sources of data are described herein. Data about an entity can be received, and the data can be authenticated. Integrated risk data about the entity can be received. The integrated risk data can include traditional risk assessment data and nontraditional risk assessment data. An integrated risk assessment value can be determined based on the integrated risk data by aligning a first output from a first risk assessment model and a second output by a second risk assessment model. A responsive message including at least the integrated risk assessment value and associated information for the entity can be transmitted to a remote computing device for use in controlling access of the entity to one or more interactive computing environments.

20 Claims, 4 Drawing Sheets

MACHINE-LEARNING TECHNIQUES FOR RISK ASSESSMENT BASED ON MULTIPLE DATA SOURCES

CROSS-REFERENCE TO RELATED APPLICATION

This application claims priority to provisional application No. 63/266,016 filed Dec. 27, 2021 entitled "INTEGRATING TRADITIONAL RISK DATA AND NONTRADITIONAL RISK DATA FOR RISK ASSESSMENT," the entirety of which is incorporated by reference herein for all purposes.

TECHNICAL FIELD

The present disclosure relates generally to risk assessment techniques for online access control. More specifically, but not by way of limitation, this disclosure relates to integrating traditional risk data and nontraditional risk data for generating outputs, such as risk assessments, using machine learning techniques with improved accuracy based on considering data from multiple sources.

BACKGROUND

Risk assessment for online access control can be performed by various computing devices. In some examples, risk assessment can involve analyzing data to determine a risk value associated with an entity accessing an online computing environment. A computing device may be configured to analyze data and determine risk based on a single source of data or using a single process. But, in some cases, the single source of data may not provide accurate risk assessment input. Additionally, the computing device may not be configured to analyze more than the single source of data or execute more than a single process for performing the risk assessment.

SUMMARY

Various aspects of the present disclosure provide systems and methods for risk assessment based on multiple data sources by integrating traditional risk data and nontraditional risk data are described herein. Data about an entity can be received, and the data can be authenticated. Integrated risk data about the entity can be received. The integrated risk data can include traditional risk assessment data and nontraditional risk assessment data. An integrated risk assessment value can be determined based on the integrated risk data by aligning a first output from a first risk assessment model and a second output by a second risk assessment model. A responsive message including at least the integrated risk assessment value and associated information for the entity can be transmitted to a remote computing device for use in controlling access of the entity to one or more interactive computing environments.

In other aspects, a system can include a processor and a non-transitory computer-readable medium that can include instructions that are executable by the processor to cause the processor to perform various operations. The system can receive data about an entity. The system can authenticate the data about the entity. The system can receive integrated risk data associated with the entity. The integrated risk data can include traditional risk assessment data and nontraditional risk assessment data. The system can determine an integrated risk assessment value based on the integrated risk data by aligning a first output from a first risk assessment model and a second output by a second risk assessment model. The system can transmit, to a remote computing device, a responsive message including at least the integrated risk assessment value and associated information for the entity for use in controlling access of the entity to one or more interactive computing environments.

In other aspects, a non-transitory computer-readable medium can include instructions that are executable by a processing device for causing the processing device to perform various operations. The operations can include receiving data about an entity. The operations can include authenticating the data about the entity. The operations can include receiving integrated risk data associated with the entity. The integrated risk data can include traditional risk assessment data and nontraditional risk assessment data. The operations can include determining an integrated risk assessment value based on the integrated risk data by aligning a first output from a first risk assessment model and a second output by a second risk assessment model. The operations can include transmitting, to a remote computing device, a responsive message including at least the integrated risk assessment value and associated information for the entity for use in controlling access of the entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION OF THE INVENTION

Figure 1:
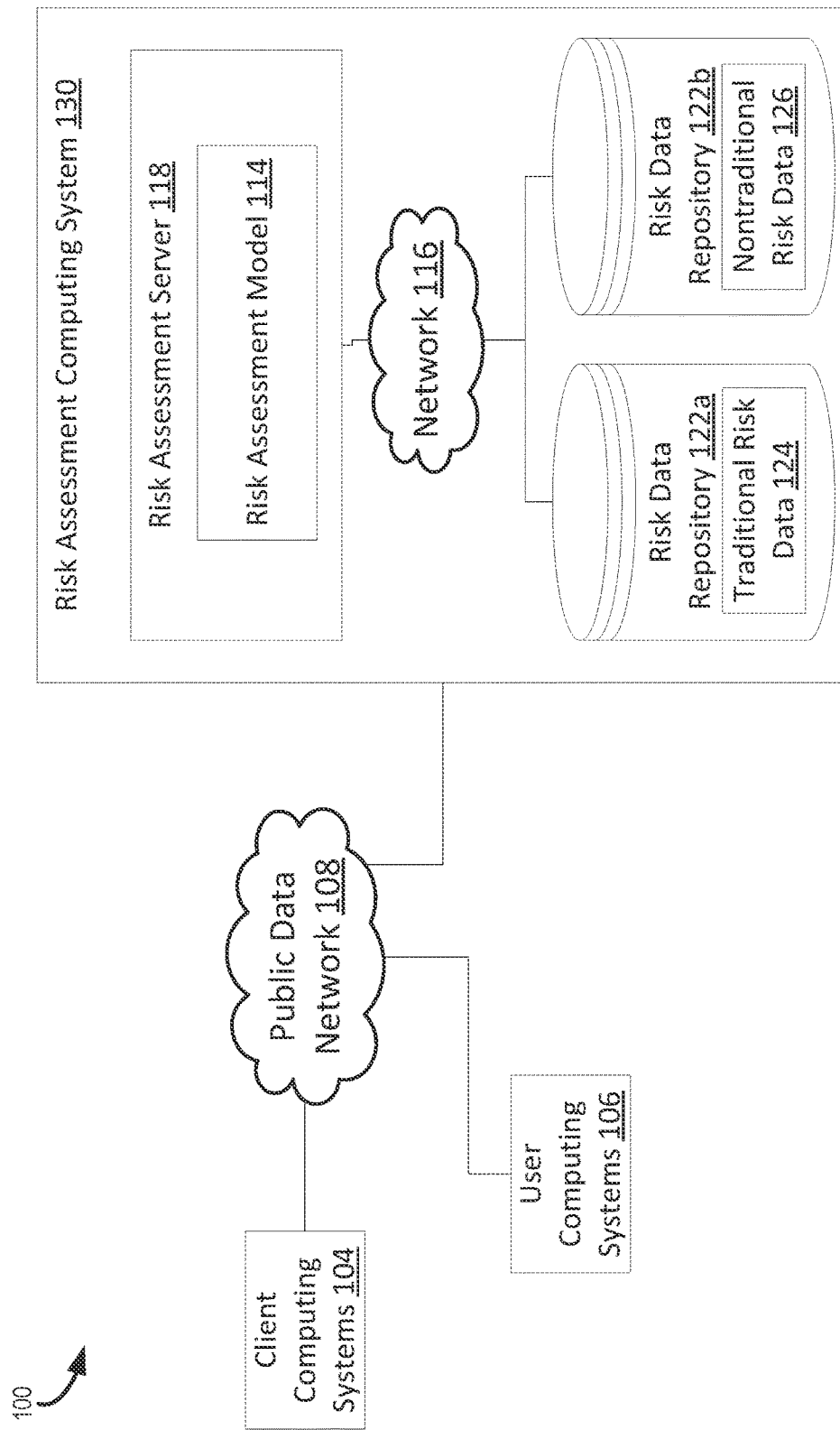
FIG. 1 is a block diagram depicting an example of an operating environment in which machine-learning techniques can be utilized to provide an improved risk assessment score based on multiple sources of data according to some aspects.

Risk assessment models can be used to determine various risk assessment values. For example, traditional risk assessment models can determine a risk indicator associated with an entity accessing a system or a service and other traditional risk assessment values using traditional risk assessment data. In some examples, the risk indicator can include a risk score for a user computing device accessing a computing environment, a credit score for a consumer accessing financial services, and the like. But, the traditional risk assessment models may not use comprehensive data. For example, the traditional risk assessment data used by the traditional risk assessment models may not be comprehensive. For example, the traditional risk assessment data may be missing some risk assessment data associated with an entity. Additionally, traditional risk assessment data may not be available for each entity. Accordingly, the traditional risk assessment model may not be able to adequately assess the risk for each entity. In some examples, entities, such as individuals, service-providers, and the like, are denied access to services since the traditional risk assessment model is unable to adequately assess risk.

Certain aspects and features of the present disclosure that use integrated risk assessment data can address one or more issues identified above. Data integration techniques can be used to enhance various outputs. For example, integrating, by using a risk assessment model, data from multiple sources can improve an integrated risk assessment value compared to a traditional risk assessment value that is determined using traditional risk assessment data. In some examples, the traditional risk assessment data can include traditionally used risk data or risk indicators such as resources, debt usage, account information, and the like relating to a target entity. Nontraditional risk assessment data, which may originate from multiple sources of data, can include data not historically used for determining risk assessment values. For example, the nontraditional risk assessment data can include residence information, online interaction history, and the like. The risk assessment model can access the data from multiple sources, may integrate the nontraditional risk assessment data with the traditional risk assessment data, may use machine-learning techniques, and the like. The risk assessment model can use the integrated risk assessment data to generate (e.g., via the machine-learning techniques) an integrated risk assessment value. The integrated risk assessment value has improved accuracy compared to the accuracy of the traditional risk assessment value since the integrated risk assessment data is more comprehensive. Additionally, the risk assessment model may be able to generate the integrated risk assessment value for each entity, whereas the traditional risk assessment model using traditional risk assessment data may not be able to adequately generate a risk assessment value for each entity. In some examples, the integrated risk assessment value may be based on data, for example the nontraditional risk assessment data, that is not available to, and techniques (e.g., the machine-learning techniques) that are not performable by, traditional risk assessment models. In some examples, the risk assessment model can provide opportunities, which may not have been accessible to the entity using the traditional risk assessment data, and which correspond to the integrated risk assessment value, to the entity. The opportunities may include potential interactions that the entity may not have previously accessed.

In some examples, the risk assessment model can provide opportunities, content recommendations, or the like to an entity, which may include a user of a user device, or the like, based on the integrated risk assessment value. The opportunities or content recommendations may include offers for which the entity may qualify and that may originate from a separate entity such as a provider entity such as a provider of goods or services. The opportunities or content recommendations may also include access to certain online computing resources such as an online interactive computing environment (e.g., a website), cloud computing resources, online storage resources, and so on. The risk assessment model can, for the entity, generate the integrated risk assessment value using integrated risk assessment data that includes data associated with the entity and originating from multiple sources of data. The integrated risk assessment value may include an enhanced (e.g., compared to a traditional risk score) risk score or other suitable integrated risk assessment value. The risk assessment model can use the integrated risk assessment value to determine one or more opportunities that may correspond to the entity, to the integrated risk assessment value associated with the entity, or to a combination thereof. The risk assessment model can selectively provide, for example by displaying via a user interface, the opportunities or content recommendations to the entity. In some examples, the provided opportunities may include an interactive feature, such as an interactive button provided with the user interface, that may allow the entity to select one or more of the provided opportunities.

As described herein, certain aspects provide improvements to controlling access to computing resources. For example, an integrated risk assessment value can be used by a risk assessment system to more accurately and efficiently control access to computing resources such as an interactive computing environment that can provide computing resources, such as computational processing power, computer memory, and the like, to the entity. In particular, techniques relating to machine-learning can be used by the risk assessment system to more accurately (e.g., compared to systems using other techniques), and using fewer resources, determine an integrated risk assessment value based on data from multiple sources. Based on the integrated risk assessment value, the risk assessment system can more accurately and efficiently control access to the computing resources. Compared with other computational techniques, the machine-learning techniques require fewer computing resources (e.g., CPU times) and storage resources (e.g., memory usage) to control access to an interactive computing environment based on data from multiple sources.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Integration of Non-Traditional Risk Data

Referring now to the drawings, FIG. 1 is a block diagram depicting an example of an operating environment 100 in which machine-learning techniques can be utilized to provide an improved risk assessment score based on multiple sources of data according to some aspects. FIG. 1 depicts examples of hardware components of a risk assessment computing system 130, according to some aspects. The risk assessment computing system 130 can be a specialized computing system that may be used for processing large amounts of data using a large number of computer processing cycles. The risk assessment computing system 130 can include a risk assessment server 118 for performing a risk assessment, such as predicting future risk score or other risk indicator of the entity, for a target entity, such as a target individual or a user of a computing device, using integrated risk assessment data that may include the traditional risk assessment data 124 and the nontraditional risk assessment data 126.

Data from multiple sources, such as traditional risk assessment data 124 and nontraditional risk assessment data 126, can be stored in one or more network-attached storage units on which various repositories, databases, or other structures are stored. Examples of these data structures can include the risk data repositories 122a-b. In some examples, the traditional risk assessment data 124 may be stored in the risk data repository 122a, and the nontraditional risk assessment data 126 may be stored in the risk data repository 122b. The risk data repositories 122a-b, and, by extension, the traditional risk assessment data 124 and the nontraditional risk assessment data 126, may be stored unintegrated. For example, the risk data repository 122a may be or include the Automated Credit Report Online (ACRO) database and/or Data Fabric database, and the risk data repository 122b may be or include the National Consumer Telecom and Utilities Exchange (NCTUE) database. ACRO and NCTUE may be unintegrated such that a first set of data included in ACRO may be different than a second set of data included in NCTUE.

Network-attached storage units may store a variety of different types of data organized in a variety of different ways and from a variety of different sources. For example, the network-attached storage unit may include storage other than primary storage located within the risk assessment server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and including data. A machine-readable storage medium or computer-readable storage medium may include a non-transitory medium in which data can be stored and that does not include carrier waves or transitory electronic signals. Examples of a non-transitory medium may include a magnetic disk or tape, optical storage media such as a compact disk or digital versatile disk, flash memory, memory, memory devices, or other suitable media.

The risk assessment server 118 can include one or more processing devices that can execute program code, such as a risk assessment model 114. The risk assessment model 114 may be a machine learning model such as a neural network, a support vector machine, one or more algorithms, and the like for conducting risk assessments. The program code can be stored on a non-transitory computer-readable medium. The risk assessment model 114 can be used to predict future risk, for example via an integrated risk assessment value, for the entity or to perform other suitable operations. The integrated risk assessment value can be utilized to make decisions about the entity. For example, the integrated risk assessment value of the entity can be used to determine whether a risk associated with granting the entity access to resources, such as computational resources, access to an interactive computing environment, and the like, is high, for example, higher than a threshold risk value. If the risk is high, the entity may be denied access to the resources. For instance, the risk may be related to the credit score or other risk score of the entity and if the credit score or other risk score, based on integrated risk assessment data, is too low (thus the risk is high), then the entity may be denied the resources. In another example, the resources may include cloud computing resources, such as online virtual machine instances, or online storage resources. The risk assessment server 118 can use the integrated risk assessment data to predict the risk for the entity. Depending on the predicted risk, the entity may be granted or denied access to the online resources.

In some examples, the risk assessment computing system 130 can determine the future risk for the entity, for example via the risk assessment server 118, by using the traditional risk assessment data 124 and the nontraditional risk assessment data 126. The traditional risk assessment data 124 can include traditionally used risk data or risk indicators such as income, debt usage, credit accounts, and the like. The nontraditional risk assessment data 126 can include data not historically used for determining risk assessment values. For example, the nontraditional risk assessment data 126 can include utility account information, bank account information, housing account information, online interaction history, and the like. The nontraditional risk assessment data 126 can be used, for example in combination with the traditional risk assessment data 124, to generate an integrated risk assessment value by the risk assessment computing system 130 or other suitable computing systems or devices. The integrated risk assessment value can be generated using risk assessment techniques involving the traditional risk assessment data 124 augmented with the nontraditional risk assessment data 126 and other suitable information. By using the integrated risk assessment data, the risk assessment computing system 130 can more accurately and more completely predict the future risk of the entity.

Furthermore, the risk assessment computing system 130 can communicate with various other computing systems such as client computing systems 104, etc. For example, the client computing systems 104 may transmit, to the risk assessment server 118 for providing to the entity, opportunities for which the entity may qualify based on the integrated risk assessment value, or the client computing systems 104 may transmit signals to the risk assessment server 118 that control or otherwise influence different aspects of the risk assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by any suitable provider of products or services. The client computing system 104 can include one or more server devices. The one or more server devices can include or can otherwise access one or more non-transitory computer-readable media. The client computing system 104 can also execute instructions that cause the client computing system 104 to provide an interactive computing environment accessible to user computing systems 106. Examples of the interactive computing environment include a mobile application specific to a particular client computing system, a web-based application accessible via a mobile device, and the like. The executable instructions can be stored in one or more non-transitory computer-readable media.

The risk assessment computing system 130 can further include one or more processing devices that can provide an interactive computing environment, such as a user interface, to perform one or more of the operations described herein. The interactive computing environment can include executable instructions stored in one or more non-transitory computer-readable media. The instructions providing the interactive computing environment can configure one or more processing devices to perform one or more of the operations described herein. In some aspects, the executable instructions for the interactive computing environment can include instructions that provide one or more graphical interfaces.

The graphical interfaces can be used by a user computing system 106 to access various functions of the interactive computing environment. For instance, the interactive computing environment may transmit data to and receive data from a user computing system 106 to shift between different states of the interactive computing environment, where the different states allow one or more electronics interactions between the user computing system 106, the risk assessment computing system 130, the client computing system 104, or any suitable combination thereof to be performed.

In some examples, a risk assessment computing system 130 may have other computing resources associated therewith, which may not be illustrated in FIG. 1, such as server computers hosting and managing virtual machine instances for providing cloud computing services, server computers hosting and managing online storage resources for users, server computers for providing database services, and others. The interaction between the user computing system 106 and the risk assessment computing system 130 may be performed through graphical user interfaces presented by the risk assessment computing system 130 to the user computing system 106, or through an application programming interface (API) calls or web service calls, or through other suitable techniques. In some examples, the interactive computing environment provided by the risk assessment computing system 130 to the user computing system 106 may allow the user computing system 106 to access one or more features, services, or interactive computing environments provided by the client computing system 104.

A user computing system 106 can include any computing device or other communication device operated by a user or entity, such as an individual or other suitable user of products or services. The user computing system 106 can include one or more computing devices, such as laptops, smartphones, tablets, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to provide data to, and receive data from, the risk assessment computing system 130. Additionally, the user computing system 106 can access certain online services from a client computing system 104 or other computing resources, to engage in electronic interactions with a client computing system 104, to obtain controlled access to electronic content hosted by the client computing system 104, etc.

For instance, the user can use the user computing system 106 to engage in an electronic interaction with a client computing system 104 via an interactive computing environment. An electronic interaction between the user computing system 106 and the client computing system 104 can include, for example, the user computing system 106 being used to request online storage resources managed by the client computing system 104, acquire cloud computing resources, such as virtual machine instances, request approval for a financial loan, and so on. An electronic interaction between the user computing system 106 and the client computing system 104 can also include, for example, a query for a set of sensitive or other controlled data, a request to access online financial services provided via the interactive computing environment, a request to submit an online credit card application or other digital application to the client computing system 104 via the interactive computing environment, operating an electronic tool within an interactive computing environment hosted by the client computing system, such as a content-modification feature, an application-processing feature, and the like.

In some examples, a website or other interactive computing environment provided by a service-providing entity can include electronic functions for obtaining one or more services, such as loan application and management tools, credit card application and interaction management workflows, online computing resources, and the like. A user computing system 106 can be used to request access to the interactive computing environment provided by the client computing system 104, which can selectively grant or deny access to various electronic functions based on a risk assessment value provided by the risk assessment server 118. Based on the request, the client computing system 104 can communicate with the risk assessment server 118 for risk assessment. Based on the risk indicator, such as the integrated risk assessment value, predicted by the risk assessment server 118, the client computing system 104 can determine whether to grant the access request of the user computing system 106 to certain features of the interactive computing environment. In some examples, the user computing system 106 may request the integrated risk assessment value from the risk assessment server 118 and can transmit the integrated risk assessment value to the client computing system 104 for determining whether to grant the access request.

In a simplified example, the system depicted in FIG. 1 can be configured to accurately determine risk assessment values, such as credit scores or other risk scores, using integrated risk assessment data. The integrated risk assessment data can include traditional risk assessment data 124 that can be augmented with nontraditional risk assessment data 126. For example, traditional data, such as credit accounts, payment histories, etc., can be augmented with nontraditional data such as utility account information, housing account information, such as rental history, online interaction data, and the like. The risk assessment model 114 can choose, for an entity, optimal nontraditional risk assessment data for optimizing (e.g., maximizing) the integrated risk assessment value.

In some examples, the integrated risk assessment value can be utilized by the service provider, for example via the client computing system 104, to determine the risk associated with the entity accessing a service provided by the service provider, thereby granting or denying access by the entity to an interactive computing environment implementing the service. For example, if the service provider can determine that the integrated risk assessment value is lower than a threshold risk indicator value. Accordingly, the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate may be instead implemented in a signal device or system.

Techniques for Predicting Future Risk Indicators Using Clustering

Figure 2:
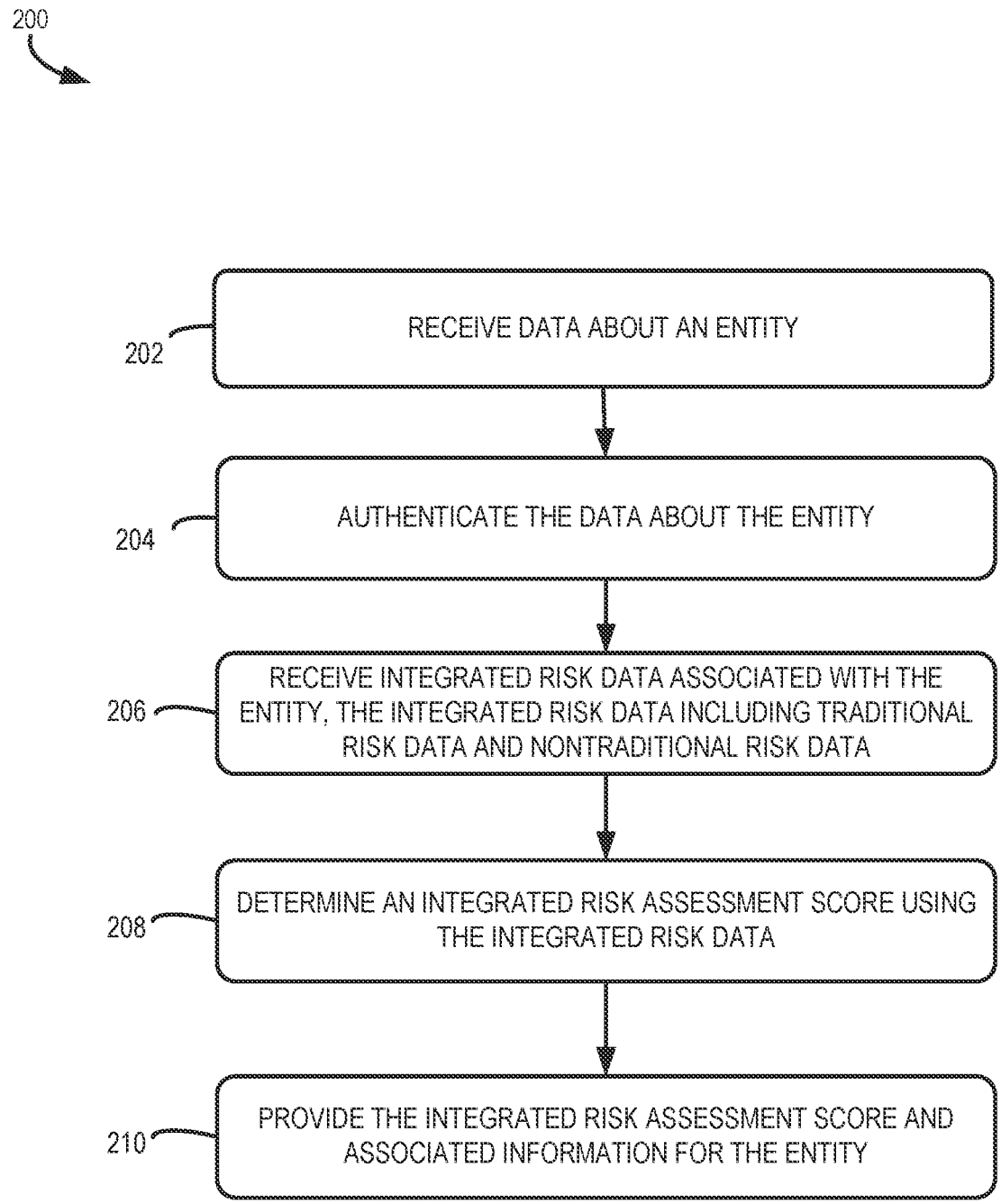
FIG. 2 is a flow chart depicting an example of a process for using machine-learning techniques to provide an improved risk assessment score based on multiple sources of data and for providing one or more opportunities for an entity according to some aspects.

FIG. 2 is a flow chart depicting an example of a process 200 for using machine-learning techniques to provide an improved risk assessment score based on multiple sources of data and for providing one or more opportunities for an entity according to some aspects. In some examples, the operations of the process 200, or any subset thereof, may be performed by the risk assessment computing system 130 via the risk assessment server 118, but other suitable computing systems, devices, or subsets or combinations thereof may perform one or more operations described with respect to the process 200.

At block 202, the process 200 involves receiving data about the entity. The data may include identification data, authentication data, account data, other suitable data about the entity, or any combination thereof. In some examples, the risk assessment server 118 may provide a user interface to the entity, for example via a user computing system 106, for receiving the data. The entity may input the data, such as a username/password combination, identification information (e.g., name, address, date of birth, phone number, email, etc.), account information (e.g., financial institution account information, etc.), and the like, into the user interface, and the risk assessment server 118 may receive the data via the user interface.

In some examples, the entity may provide the data to the risk assessment server 118 for updating a risk assessment value associated with the entity. For example, a traditional risk assessment value, such as a credit score or other risk score determined using traditional data, may be incomplete, outdated, or otherwise unsatisfactory for the entity. The entity may provide identifying information that includes at least a name, address, social security number, and the like, or other suitable information, to the risk assessment server 118 for updating, for example by including comprehensive data or more recent data in, the risk assessment value associated with the entity. The data received by the risk assessment server 118 may additionally include a request for the risk assessment server 118 to update the risk assessment value associated with the entity or to generate a different risk assessment value, such as an integrated risk assessment value, associated with the entity.

At block 204, the process 200 involves authenticating the data about the entity. The risk assessment server 118 can authenticate or otherwise verify the received data associated with the entity. For example, the risk assessment server 118 can compare the received data to data included in one or more databases, such as the risk data repositories 122a-b, or the like, for determining an authenticity of a request for generating the integrated risk assessment value. If the risk assessment server 118 successfully authenticates the received data, the risk assessment server 118 may proceed, for example to other operations of the process 200, with updating the risk assessment value. If the received data is fraudulent or otherwise incorrect or inconsistent with existing data about the entity, the risk assessment server 118 may not proceed with updating the risk assessment value and may, instead, return an error to the entity or any device thereof.

At block 206, the process 200 involves receiving integrated risk data associated with the entity. The integrated risk data may include traditional risk assessment data 124 and nontraditional risk assessment data 126. The integrated risk data may include any other suitable risk data associated with the entity. The risk assessment server 118 can receive the integrated risk assessment data, for example, from the risk data repositories 122a-b or from other suitable sources of risk assessment data. In some examples, the risk assessment server 118 can execute a call (e.g., an API call) to the risk data repository 122a, to the risk data repository 122b, or to a combination thereof for retrieving the traditional risk assessment data 124 and the nontraditional risk assessment data 126, respectively.

In some examples, the traditional risk assessment data 124 may include risk data that may have historically been used to generate risk assessment values. For example, the traditional risk assessment data 124 can include payment history, credit usage, credit account, and other suitable information relating to traditional risk assessment data 124 associated with the entity. In some examples, the nontraditional risk assessment data 126 may include information associated with the entity that may not be accessible to traditional risk assessment models or that may not be historically used to generate risk assessment values. For example, the nontraditional risk assessment data 126 can include bank account information, utility account information, housing account information, online interaction data, other suitable consented information associated with the entity, or any combination thereof.

The risk assessment server 118 can integrate the traditional risk assessment data 124 and the nontraditional risk assessment data 126. For example, the risk assessment server 118 can use the risk assessment model 114 to compile integrated risk data. In some examples, the risk assessment server 118 may include, or may have previously compiled, risk data corresponding to the traditional risk assessment data 124. For example, the risk assessment server 118 may have previously generated a risk score for the entity based on the traditional risk assessment data 124. Accordingly, the risk assessment server 118 may augment the existing risk data with the nontraditional risk assessment data 126. In other examples, the risk assessment server 118 may receive updated traditional risk assessment data from the risk data repository 122a in addition to receiving the nontraditional risk assessment data 126 from the risk data repository 122b.

In some examples, the risk assessment server 118 can selectively receive consented information from the entity. Consented information may include information or other suitable types of data not traditionally included in risk assessment techniques. For example, consented information can include bank account information, utility account information, housing account information, online interaction data, other suitable consented information associated with the entity, or any combination thereof. The risk assessment server 118 can provide a user interface to the entity, for example via one or more of the user computing systems 106, and the user interface may include a field for allowing the entity to input a type of consented information and associated consent for sharing the type of consented information. For example, the user interface may include a drop-down menu that includes various types of consented information, the entity may select from the drop-down menu, and the entity may provide consent, such as via a signature, for sharing the consented information between the source of the consented information and the risk assessment server 118. The risk assessment server 118 may augment the traditional risk assessment data 124 with the consented information (e.g., the risk assessment server 118 can store the consented information in the risk data repository 122a) or may perform other suitable tasks using the consented information.

At block 208, the process 200 involves determining an integrated risk assessment value or score using the integrated risk assessment data. The risk assessment server 118 may use the risk assessment model 114, which can use the integrated risk assessment data, to determine the integrated risk assessment value. For example, the risk assessment server 118 may generate the integrated risk assessment value, based on the integrated risk assessment data, for predicting future risk associated with the entity. Additionally, the risk assessment server 118 may generate, or otherwise receive, a traditional risk assessment value, which may be based on the traditional risk assessment data 124 instead of the integrated risk assessment data.

In some examples, the risk assessment server 118 can selectively use the integrated risk assessment data to determine the integrated risk assessment value. The integrated risk assessment value may be greater than, similar to, or less than the traditional risk assessment value. For example, the integrated risk assessment value may be greater than the traditional risk assessment value. In this example, the risk assessment server 118 may select the integrated risk assessment value for determining opportunities for which the entity qualifies. In other examples, the integrated risk assessment value may be less than the traditional risk assessment value, and the risk assessment server 118 may use the traditional risk assessment value to determine the opportunities or to otherwise provide a risk assessment value for the entity. The risk assessment server 118 may determine a subset of the integrated risk assessment data for use in determining the integrated risk assessment value by optimizing the integrated risk assessment value. Optimizing the integrated risk assessment value may involve maximizing the scalar of the value, maximizing the accuracy of the value, maximizing a value of the integrated risk assessment value for the entity, for service providers, and the like. For example, the risk assessment server 118 may determine to use online interaction data of the entity and to not use utility account information of the entity for determining the integrated risk assessment value. In some examples, the risk assessment server 118 can select the integrated risk assessment data to use for determining the integrated risk assessment value without requesting credentials or other input from the entity. The risk assessment server 118 may perform other tasks for selectively determining nontraditional risk assessment data 126 for use in determining the integrated risk assessment value.

In some examples, the risk assessment server 118 can build the risk assessment model 114, which can include one or more trained models, for determining the integrated risk assessment score. For example, the risk assessment server 118 can build and train a first model using the traditional risk assessment data 124 and can build and train a second model using the nontraditional risk assessment data 126. Outputs, such as a first output and a second output, of the first model and of the second model, respectively, can be combined for determining the integrated risk assessment score.

The first output and the second output can be aligned. For example, the raw data of the first output and the raw data of the second output may not properly map or correspond, meaning comparison may be meaningless in some examples. Accordingly, the risk assessment server 118 can align the first output and second output by transforming a logistic regression of each model or neural network probabilities of each model into a standardized score. For example, the risk assessment server 118 can align the probabilities of the second model with the probabilities of the first model using various techniques.

The risk assessment server 118 can generate a baseline mapping, for the first model and the second model, between the probabilities. For example, the risk assessment server 118 can generate a fitted polynomial trend-line between the first model and corresponding odds of a model-development sample. Additionally, the risk assessment server 118 can determine a mapping, such as a linear trend-line, between raw scores of the second model to estimated odds. The risk assessment server 118 can use the trend-lines to determine an aligned score between the first model and the second model.

The risk assessment server 118 may apply extra points or additional score value based on the nontraditional risk assessment data 126. For example, the second output may be greater than the first output, and, accordingly, the additional score value may be similar or identical to the difference between the second output and the first output. In some examples, if the first output is greater than or equal to the second output, then the additional score may be set to zero to ensure that the integrated risk assessment score is greater than or equal to the traditional risk assessment score.

A cap, or a maximum limit, on the additional score can be applied. In some examples, the cap can include a universal numerical value (e.g., the additional score may not be greater than 80 points, etc.) or a percentile-dependent numerical value (e.g., the additional score may not be greater than 80 points for the $25^{th}$ percentile scores, etc.). The cap may be used to control or otherwise account for outlier values in the integrated risk assessment score. Without a cap, an inverse trend may be observed: the lowest traditional risk assessment scores may experience the largest increases to arrive at the integrated risk assessment scores and the highest traditional risk assessment scores may experience the smallest increases to arrive at the integrated risk assessment scores. Applying the cap may smooth the difference between increases between the lowest and highest traditional risk assessment scores and the corresponding integrated risk assessment scores. In some examples, a two-part numerical value cap (e.g., applied to scores below the $50^{th}$ percentile and to scores above the $50^{th}$ percentile, or any other suitable percentiles) may provide the closest mapping of integrated risk assessment score probabilities to the traditional risk assessment probabilities. Accordingly, the risk assessment server 118, using the risk assessment model 114, can use the aligned probabilities, the additional scores, and the cap to generate and output the integrated risk assessment score.

At block 210, the process 200 involves providing the integrated risk assessment value and associated information to the entity. The risk assessment server 118 can generate the integrated risk assessment value and can transmit the integrated risk assessment value for the entity. For example, the risk assessment server 118 can output the integrated risk assessment value for display on the user computing system 106. In some examples, the risk assessment server 118 can cause a user interface to be generated and presented on the user computing system 106, and the user interface can be used to display or otherwise provide the integrated risk assessment value.

In some examples, the risk assessment server 118 can provide associated information with the integrated risk assessment value. For example, the associated information can include a traditional risk assessment value of the entity, one or more opportunities for which the entity qualifies based on the integrated risk assessment values, other suitable associated information, or any suitable combination thereof. In one such example, the risk assessment server 118 can output the integrated risk assessment value alongside, or otherwise with, the traditional risk assessment value for comparison. For example, the entity can compare the integrated risk assessment value based on the integrated risk assessment data to the traditional risk assessment value that may only use the traditional risk assessment data 124. Additionally, the risk assessment server 118 can determine and provide one or more opportunities for which the entity qualifies based on the integrated risk assessment value. For example, the risk assessment server 118 can determine an opportunity, such as a content recommendation or an offer from a separate entity such as a financial institution or the like, for which the entity qualifies based on the integrated risk assessment value, which may include an enhanced risk score, and can provide the opportunity or content recommendation to the entity via the user interface or other suitable means.

In some examples, the risk assessment server 118 can use geolocation techniques to provide opportunities to the entity along with the integrated risk assessment value. For example, the risk assessment server 118 may access or otherwise receive a geolocation of a user computing system 106 and may provide, via a user interface or other means, an option to the entity, via the user computing system 106, for causing the risk assessment server 118 to determine the integrated risk assessment value for requesting a nearby product or service. In another example, the risk assessment server 118 can determine the integrated risk assessment value and can use the geolocation information to provide nearby opportunities to the entity for which the entity may qualify based on the determined, integrated risk assessment value.

In some examples, the risk assessment server 118 can provide guidance to the entity. For example, the risk assessment server 118 can provide, in addition to the integrated risk assessment value, guidance relating to the integrated risk assessment value for improving the integrated risk assessment value, the traditional risk assessment value, and the like. In some examples, the user interface, which can include or provide the determined integrated risk assessment value, provided by the risk assessment server 118, can execute, or cause execution of, an API call for requesting the guidance provided by the risk assessment server 118. For example, the entity can select an option on the user interface to provide guidance to the entity, and the risk assessment server 118, or the user interface provided by the risk assessment server 118, can execute the API call to a service that may provide a guidance process that may be offered or executed by the risk assessment server 118, etc.

In some examples, the risk assessment server 118 can transmit a responsive message including at least the integrated risk assessment value for use in controlling access of the entity to one or more interactive computing environments. The risk assessment server 118 can transmit the responsive message to a remote computing system such as the client computing system 104, and the like. The responsive message may cause computing resources to be allocated, or to not be allocated, to the entity based on the integrated risk assessment value. Additionally or alternatively, the responsive message may cause opportunities to be presented to the entity.

Example of User Interface

Figure 3:
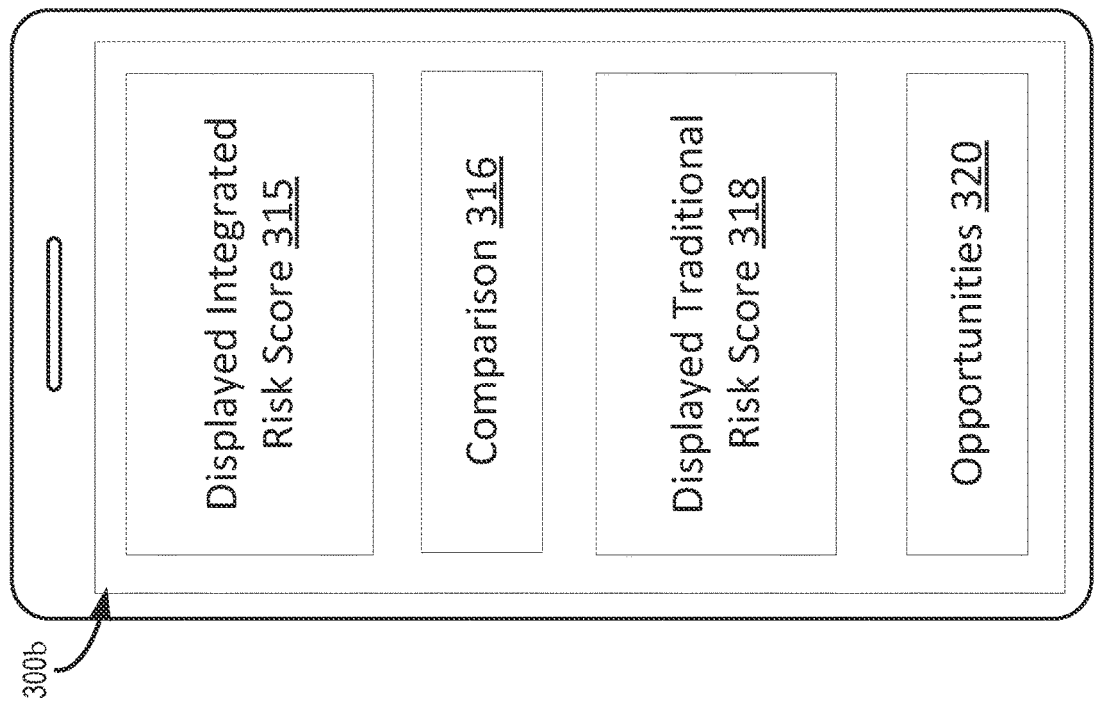
FIG. 3 shows examples of user interfaces that can be used to provide an improved risk assessment score according to some aspects.
Figure 3:
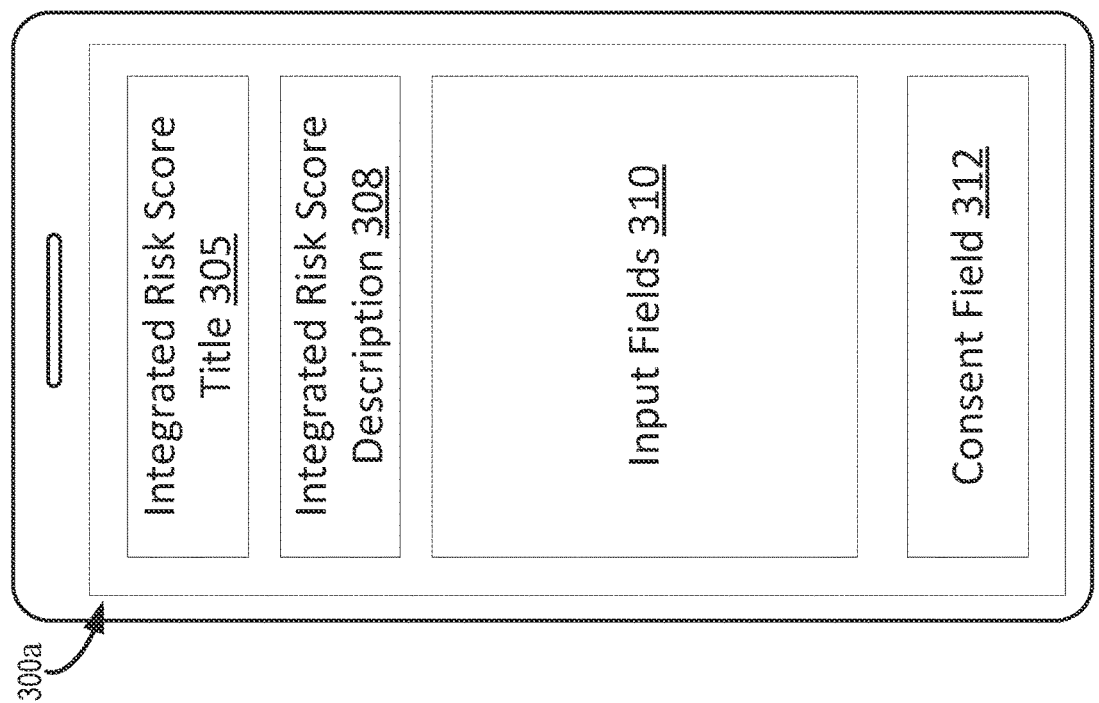

FIG. 3 is an example of a user interface 300 that can be used to provide the integrated risk assessment score according to some aspects. As illustrated, FIG. 3 includes user interface pages 300*a-b*, which may be separate pages of the user interface 300. For example, the user interface page 300*a* can be provided, for example by the risk assessment server 118, to an entity for receiving data about the entity, and the user interface page 300*b* can be provided, for example by the risk assessment server 118, to the entity for providing the integrated risk assessment score to the entity. The user interface pages 300*a-b* can be provided to or otherwise displayed on a user device, which may be similar or identical to the user computing system 106, using a display screen or other suitable output device or component. Other suitable user interface pages, which can be used for any suitable purposes relating to the integrated risk assessment score, can be included in or otherwise accessible via the user interface 300.

The user interface page 300*a* can include a field for presenting an integrated risk assessment score title 305, a field providing an integrated risk assessment score description 308, one or more input fields 310, and a consent field 312. The user interface page 300*a* can include other suitable components or fields. The integrated risk assessment score title 305 can include a title or name of the integrated risk assessment score, and the integrated risk assessment score description 308 can include a description that describes what the integrated risk assessment score is, what the integrated risk assessment score may indicate, or other information relating to the integrated risk assessment score. The input fields 310 can include one or more interactive fields that may be configured to receive information from the entity or other user of the user device 302. For example, the input fields 310 can be used to receive identification information, such as name, address, social security number, and the like, about the entity or other information that can be used to determine the integrated risk assessment score. The consent field 312 can include an interactive field for receiving consent from the entity. The consent may allow the risk assessment server 118 to use data, received via the input fields 310, about the entity to determine the integrated risk assessment score for the entity. In some examples, the consent field 312 can include a drop-down menu that may allow the entity to select consented information to provide for determining the integrated risk assessment score. Once the entity provides a minimum amount of information, for example via the input fields 310 and the consent field 312, the user device 302 may transmit the received data to the risk assessment server 118 for determining the integrated risk assessment score for the entity.

The user interface page 300b can include a field for presenting integrated risk assessment score 315, a field for showing a comparison 316, a field for displaying traditional risk assessment score 318, and a field for presenting one or more opportunities 320. The risk assessment server 118 can determine the integrated risk assessment score and the traditional risk assessment score for the entity and can transmit the determined scores to be presented on the user interface page 300b. The displayed integrated risk assessment score 315 may include a numerical value of the integrated risk assessment score, a visual representation of the integrated risk assessment score, or other suitable information for conveying the integrated risk assessment score. The displayed traditional risk assessment score 318 may include a numerical value of the traditional risk assessment score, a visual representation of the traditional risk assessment score, or other suitable information for conveying the traditional risk assessment score. The comparison 316 may be positioned between the displayed scores or in any other suitable location on the user interface page 300b. The comparison 316 may highlight one or more differences between the displayed integrated risk assessment score 315 and the displayed traditional risk assessment score 318. For example, the comparison 316 may display the numerical difference between the scores, reasons for the numerical difference, and any other suitable comparison information between the displayed integrated risk assessment score 315 and the displayed traditional risk assessment score 318.

The opportunities 320 may be displayed at the bottom of the user interface page 300b. In some examples, the entity may select an option on the user interface page 300b that may cause the user device to display a separate user interface page (not shown) for displaying the opportunities 320. The opportunities 320 may include offers, for example from providers of goods or services, for which the entity qualifies based on the integrated risk assessment score. In some examples, the opportunities 320 can be determined and output by the risk assessment server 118. The opportunities 320 may include interactive fields that, when selected by the entity, can cause the user device 302 to display more information about the corresponding opportunity. In some examples, the interactive fields of the opportunities 320 may include a link that may cause the user device 302 to display a different application, website, or the like for allowing the entity to accept or receive the opportunities 320.

Example of Computing System

Figure 4:
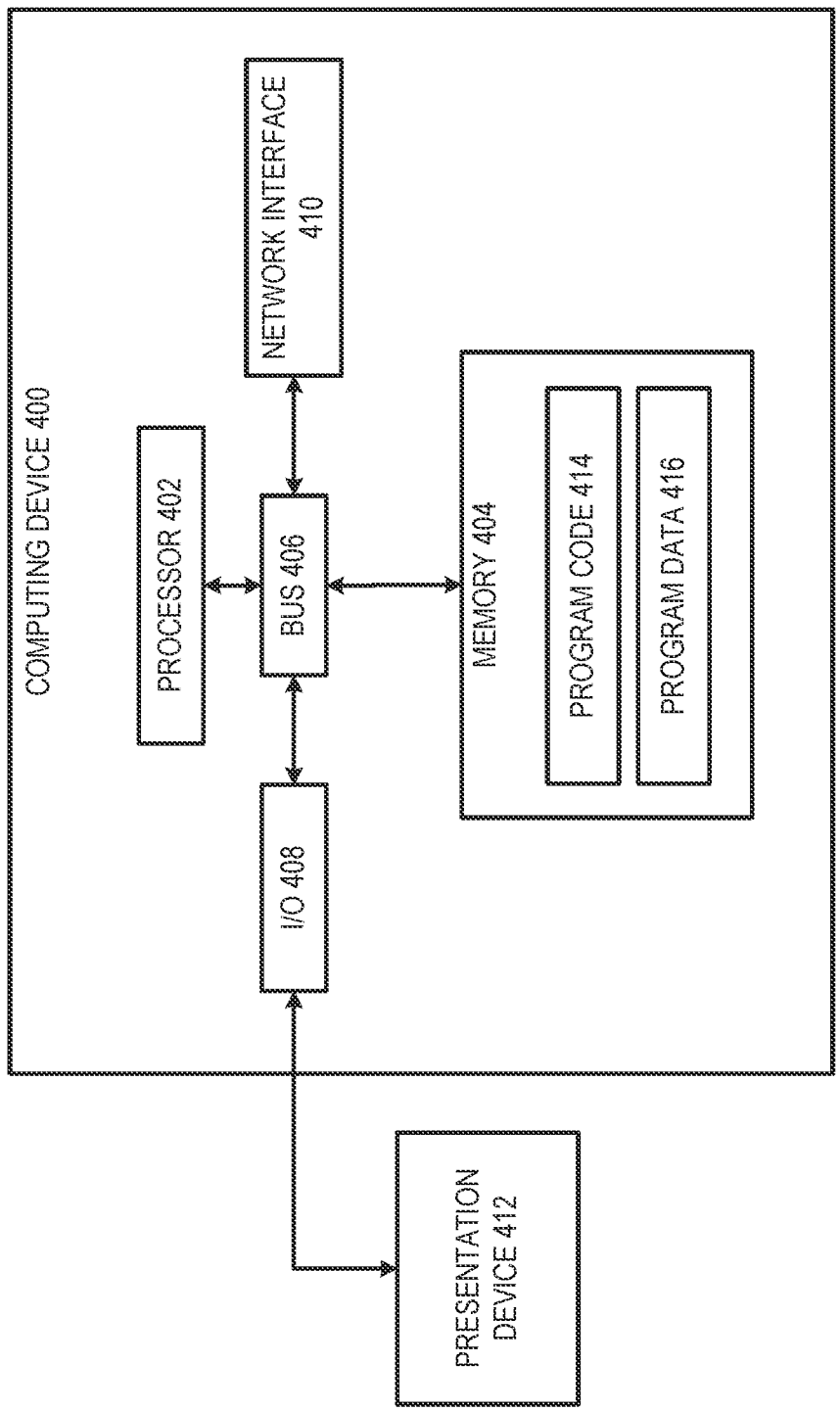
FIG. 4 is a block diagram depicting an example of a computing device, which can be used to implement the embodiments described herein according to some aspects.

Any suitable computing system or group of computing systems can be used to perform the operations for the data integration and risk assessment techniques described herein. For example, FIG. 4 is a block diagram depicting an example of a computing device 400, which can be used to implement the risk assessment server 118. The computing device 400 can include various devices for communicating with other devices in the operating environment 100, as described with respect to FIG. 1. The computing device 400 can include various devices for performing one or more risk assessment operations described above with respect to FIGS. 1-2.

The computing device 400 can include a processor 402 that is communicatively coupled to a memory 404. The processor 402 can execute computer-executable program code stored in the memory 404, can access information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 402 can include a microprocessor, an application-specific integrated circuit (ASIC), a field-programmable gate array (FPGA), or any other suitable processing device. The processor 402 can include any suitable number of processing devices, including one. The processor 402 can include or communicate with a memory 404. The memory 404 can store program code that, when executed by the processor 402, causes the processor 402 to perform the operations described herein.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 400 may also include a number of external or internal devices such as input or output devices. For example, the computing device 400 is illustrated with an input/output interface 408 that can receive input from input devices or provide output to output devices. A bus 406 can also be included in the computing device 400. The bus 406 can communicatively couple one or more components of the computing device 400.

The computing device 400 can execute program code 414 that includes the risk assessment model 114. The program code 414 for the risk assessment model 114 may be resident in any suitable computer-readable medium and may be executed on any suitable processing device. For example, as depicted in FIG. 4, the program code 414 for the risk assessment model 114 can reside in the memory 404 at the computing device 400 along with the program data 416 associated with the program code 414, such as the traditional risk assessment data 124 or the nontraditional risk assessment data 126. Executing the risk assessment model 114 can configure the processor 402 to perform the operations described herein.

In some aspects, the computing device 400 can include one or more output devices. One example of an output device can be the network interface device 410 depicted in FIG. 4. A network interface device 410 can include any device or group of devices suitable for establishing a wired or wireless data connection to one or more data networks described herein. Non-limiting examples of the network interface device 410 can include an Ethernet network adapter, a modem, etc.

Another example of an output device can include the presentation device 412 depicted in FIG. 4. A presentation device 412 can include any device or group of devices suitable for providing visual, auditory, or other suitable sensory output. Non-limiting examples of the presentation device 412 can include a touchscreen, a monitor, a speaker, a separate mobile computing device, etc. In some aspects, the presentation device 412 can include a remote client-computing device that communicates with the computing device 400 using one or more data networks described herein. In other aspects, the presentation device 412 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method that includes one or more processing devices performing operations comprising:
   receiving, by a risk assessment computing system, data about an entity;
   authenticating, by the risk assessment computing system, the data about the entity;
   receiving, by the risk assessment computing system, integrated risk data associated with the entity, the integrated risk data including traditional risk assessment data and nontraditional risk assessment data wherein the nontraditional risk assessment data comprises residence information, online interaction history, housing account information, or any combination thereof;
   determining, by the risk assessment computing system, an integrated risk assessment value of the entity based on the integrated risk data by:
      aligning a first output from a first risk assessment model and a second output by a second risk assessment model;
      generating an additional score value based on a differential between the first output and the second output when the second output is greater than the first output; and
      adding the additional score value to the alignment between the first output and the second output to generate the integrated risk assessment value; and
   transmitting, by the risk assessment computing system and to a remote computing device, a responsive message including at least the integrated risk assessment value and associated information for the entity for use in controlling access of the entity to one or more interactive computing environments.

2. The method of claim 1, further comprising:
   determining, by the risk assessment computing system, a content recommendation associated with the entity and corresponding to the integrated risk assessment value; and
   providing, by the risk assessment computing system, the content recommendation for the entity.

3. The method of claim 2, wherein the associated information includes the content recommendation, wherein receiving the data about the entity comprises receiving the data via a user interface, and wherein transmitting the responsive message comprises outputting, for display on the user interface, the integrated risk assessment value and an interactive feature associated with the content recommendation.

4. The method of claim 2, wherein determining the content recommendation comprises using geolocation information associated with the entity to determine the content recommendation, and wherein determining the integrated risk assessment value comprises using the geolocation information to provide an option to the entity for updating the integrated risk assessment value.

5. The method of claim 1, wherein receiving the integrated risk data comprises receiving consented data and corresponding consent from the entity, and wherein determining the integrated risk assessment value comprises selectively using the consented data and the integrated risk data to determine the integrated risk assessment value.

6. The method of claim 1, wherein determining the integrated risk assessment value comprises:
   determining, using the first risk assessment model, the first output using the traditional risk assessment data;
   determining, using the second risk assessment model, the second output using the nontraditional risk assessment data;
   generating a baseline mapping between outputs of the first risk assessment model and the second risk assessment model; and
   aligning, using the first output, the second output, and the baseline mapping, the outputs of the first risk assessment model and the second risk assessment model.

7. The method of claim 6, wherein aligning the outputs of the first risk assessment model and the second risk assessment model comprises:
   transforming a logistic regression of the first risk assessment model and the second risk assessment model into a standardized score; or
   transforming neural network probabilities of the first risk assessment model and the second risk assessment model into the standardized score.

8. A system comprising:
   a processor; and
   a non-transitory computer-readable medium comprising instructions that are executable by the processor to cause the processor to perform operations comprising:
      receiving, by a risk assessment computing system, data about an entity;
      authenticating, by the risk assessment computing system, the data about the entity;
      receiving, by the risk assessment computing system, integrated risk data associated with the entity, the integrated risk data including traditional risk assessment data and nontraditional risk assessment data wherein the nontraditional risk assessment data comprises residence information, online interaction history, housing account information, or any combination thereof;
      determining, by the risk assessment computing system, an integrated risk assessment value of the entity based on the integrated risk data by:
         aligning a first output from a first risk assessment model and a second output by a second risk assessment model;
         generating an additional score value based on a differential between the first output and the second output when the second output is greater than the first output; and
         adding the additional score value to the alignment between the first output and the second output to generate the integrated risk assessment value; and
      transmitting, by the risk assessment computing system and to a remote computing device, a responsive message including at least the integrated risk assessment value and associated information for the entity for use in controlling access of the entity to one or more interactive computing environments.

9. The system of claim 8, wherein the operations further comprise:
determining a content recommendation associated with the entity and corresponding to the integrated risk assessment value; and
providing the content recommendation for the entity.

10. The system of claim 9, wherein the associated information includes the content recommendation, wherein the operation of receiving the data about the entity comprises receiving the data via a user interface, and wherein the operation of transmitting the responsive message comprises outputting, for display on the user interface, the integrated risk assessment value and an interactive feature associated with the content recommendation.

11. The system of claim 9, wherein the operation of determining the content recommendation comprises using geolocation information associated with the entity to determine the content recommendation, and wherein the operation of determining the integrated risk assessment value comprises using the geolocation information to provide an option to the entity for updating the integrated risk assessment value.

12. The system of claim 8, wherein the operation of receiving the integrated risk data comprises receiving consented data and corresponding consent from the entity, and wherein the operation of determining the integrated risk assessment value comprises selectively using the consented data and the integrated risk data to determine the integrated risk assessment value.

13. The system of claim 8, wherein the operation of determining the integrated risk assessment value comprises:
determining, using the first risk assessment model, the first output using the traditional risk assessment data;
determining, using the second risk assessment model, the second output using the nontraditional risk assessment data;
generating a baseline mapping between outputs of the first risk assessment model and the second risk assessment model; and
aligning, using the first output, the second output, and the baseline mapping, the outputs of the first risk assessment model and the second risk assessment model.

14. The system of claim 13, wherein the operation of aligning the outputs of the first risk assessment model and the second risk assessment model comprises:
transforming a logistic regression of the first risk assessment model and the second risk assessment model into a standardized score; or
transforming neural network probabilities of the first risk assessment model and the second risk assessment model into the standardized score.

15. A non-transitory computer-readable medium comprising instructions that are executable by a processing device for causing the processing device to perform operations comprising:
receiving, by a risk assessment computing system, data about an entity;
authenticating, by the risk assessment computing system, the data about the entity;
receiving, by the risk assessment computing system, integrated risk data associated with the entity, the integrated risk data including traditional risk assessment data and nontraditional risk assessment data wherein the nontraditional risk assessment data comprises residence information, online interaction history, housing account information, or any combination thereof;
determining, by the risk assessment computing system, an integrated risk assessment value of the entity based on the integrated risk data by:
aligning a first output from a first risk assessment model and a second output by a second risk assessment model;
generating an additional score value based on a differential between the first output and the second output when the second output is greater than the first output; and
adding the additional score value to the alignment between the first output and the second output to generate the integrated risk assessment value; and
transmitting, by the risk assessment computing system and to a remote computing device, a responsive message including at least the integrated risk assessment value and associated information for the entity for use in controlling access of the entity to one or more interactive computing environments.

16. The non-transitory computer-readable medium of claim 15, wherein the operations further comprise:
determining a content recommendation associated with the entity and corresponding to the integrated risk assessment value; and
providing the content recommendation for the entity.

17. The non-transitory computer-readable medium of claim 16, wherein the associated information includes the content recommendation, wherein the operation of receiving the data about the entity comprises receiving the data via a user interface, and wherein the operation of transmitting the responsive message comprises outputting, for display on the user interface, the integrated risk assessment value and an interactive feature associated with the content recommendation.

18. The non-transitory computer-readable medium of claim 16, wherein the operation of determining the content recommendation comprises using geolocation information associated with the entity to determine the content recommendation, and wherein the operation of determining the integrated risk assessment value comprises using the geolocation information to provide an option to the entity for updating the integrated risk assessment value.

19. The non-transitory computer-readable medium of claim 15, wherein the operation of receiving the integrated risk data comprises receiving consented data and corresponding consent from the entity, and wherein the operation of determining the integrated risk assessment value comprises selectively using the consented data and the integrated risk data to determine the integrated risk assessment value.

20. The non-transitory computer-readable medium of claim 15, wherein the operation of determining the integrated risk assessment value comprises:
determining, using the first risk assessment model, the first output using the traditional risk assessment data;
determining, using the second risk assessment model, the second output using the nontraditional risk assessment data;
generating a baseline mapping between outputs of the first risk assessment model and the second risk assessment model; and
aligning, using the first output, the second output, and the baseline mapping, the outputs of the first risk assessment model and the second risk assessment model by:

transforming a logistic regression of the first risk assessment model and the second risk assessment model into a standardized score; or
transforming neural network probabilities of the first risk assessment model and the second risk assessment model into the standardized score.

\* \* \* \* \*